United States Patent [19]

Aalto et al.

[11] Patent Number: 5,074,198
[45] Date of Patent: Dec. 24, 1991

[54] FOCUSSED VENTILATION PROCEDURE FOR A WORK SPOT AND APPARATUS USED IN THE PROCEDURE

[75] Inventors: Erkki Aalto, Kausala; Teuvo Pellinen, Villähde; Jouko Eloranta; Tapio Alapuranen, both of Kausala, all of Finland

[73] Assignee: Halton OY, Finland

[21] Appl. No.: 460,899

[22] PCT Filed: Jun. 8, 1989

[86] PCT No.: PCT/FI89/00103
§ 371 Date: Feb. 9, 1990
§ 102(e) Date: Feb. 9, 1990

[87] PCT Pub. No.: WO89/11929
PCT Pub. Date: Dec. 14, 1989

[30] Foreign Application Priority Data

Jun. 10, 1988 [FI] Finland ............................ 882763
Jun. 7, 1989 [FI] Finland ............................ 892798

[51] Int. Cl.⁵ ............................................. F24F 9/00
[52] U.S. Cl. ................................... 454/191; 454/56; 454/63
[58] Field of Search ................. 98/36, 115.1, 115.3, 98/115.4; 126/299 D

[56] References Cited

U.S. PATENT DOCUMENTS

| 3,018,712 | 1/1962 | Wacker ............................ 98/36 |
| 3,111,077 | 11/1963 | Cortrighy ........................ 98/115.3 |
| 3,752,056 | 8/1973 | Chamberlin et al. ............... 98/115.3 |
| 3,880,061 | 4/1975 | Hensiek et al. ................... 98/115.1 |
| 4,117,833 | 10/1978 | Mueller ........................... 926/299 D |
| 4,284,236 | 8/1981 | Bradshaw ......................... 98/115.1 X |
| 4,781,108 | 11/1988 | Nillson ............................ 98/36 |
| 4,811,724 | 3/1989 | Aalto et al. ....................... 98/36 X |
| 4,880,581 | 11/1989 | Dastoli et al. .................... 98/115.3 X |

FOREIGN PATENT DOCUMENTS

| 1122296 | 1/1962 | Fed. Rep. of Germany ..... 98/115.3 |
| 2900575 | 7/1980 | Fed. Rep. of Germany . |
| 3404775 | 7/1985 | Fed. Rep. of Germany . |
| 1075835 | 3/1989 | Japan ............................... 98/36 |
| 664932 | 1/1952 | United Kingdom ............... 98/115.3 |
| 1327304 | 8/1973 | United Kingdom ............... 98/115.3 |

Primary Examiner—Harold Joyce
Attorney, Agent, or Firm—Steinberg & Raskin

[57] ABSTRACT

A focussed ventilation method and apparatus for a work space, in the method and apparatus suction is focussed on the source of impurities of the work spot and/or on the source of excess heat, and the operation of the focussed suction is assisted with the air blown from a wide surface area at a low speed from an incoming air means.

2 Claims, 6 Drawing Sheets

FOCUSSED VENTILATION PROCEDURE FOR A WORK SPOT AND APPARATUS USED IN THE PROCEDURE

BACKGROUND OF THE INVENTION

The method concerns a focussed ventilation procedure and an apparatus used in this procedure.

Focussed ventilation apparatuses of air impurities are known in the art in which suction is focussed on a work site -specific source of impurities. The impurities are drawn off from the work space prior to entering the respiratory zone of the person working in said work spot.

SUMMARY OF THE INVENTION

The object is a focussed ventilation procedure of a completely novel type and a respective means with which it has been feasible to enhance considerably the removal of air impurities from a work space.

The focussed ventilation method of the invention is mainly characterized in that in the method suction is focussed on a source of impurities of a work space and the operation of the focussed suction is assisted with the air blown from an incoming air means from a wide surface area at low speed.

The focussed ventilation means of the invention is mainly characterized in that the apparatus comprises at least one suction means and at least one incoming air means which have been disposed to be located in the vicinity of a source of impurities of a work space so that through said suction means a suction is focussed on the source of impurities of this work spot and that the operation of said suction is assisted with an air mass blown from said incoming air means.

BRIEF DESCRIPTION OF THE DRAWINGS

The invention is described hereinafter referring to some advantageous embodiments of the invention presented in the figures of the drawing but to which the invention is not exclusively intended to be confined.

DESCRIPTION OF THE PREFERRED EMBODIMENTS

In the invention the entire air mass of the work space is brought into slow movement. The direction of movement is so selected that the air of the work spot containing impurities and/or excess heat moves off from the work spot without entering the respiratory zone of the person working in the work spot.

Figure 1A:
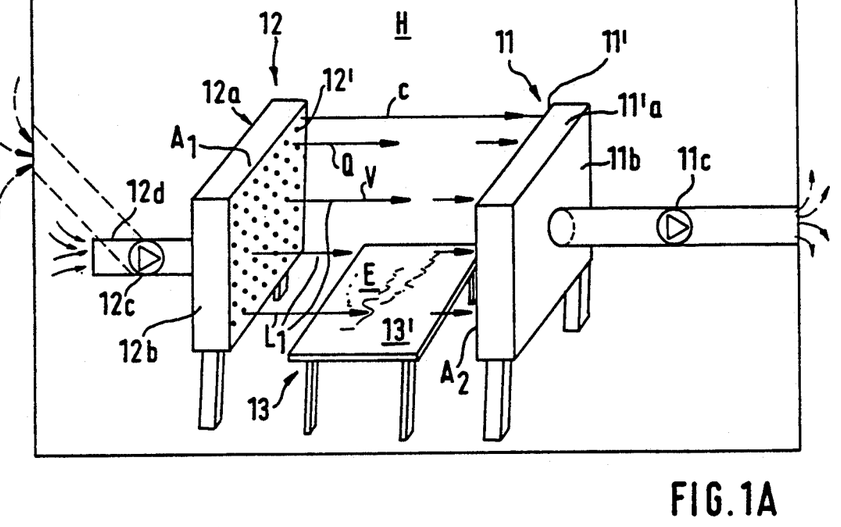
FIG. 1A presents a partially schematic view of first advantageous embodiment of the procedure and the means design of the invention.

As shown in FIG. 1A, such a focussed ventilation apparatus is used in the procedure as comprises at least one suction means 11 and at least one incoming air means 12. With the air of the suction means 11, suction is focussed on the source of impurities and/or the source of excess heat E of the work space 13, and, as taught by the invention, said suction is assisted with the aid of a blowing pushing the air transmitted from the incoming air means 12.

In all of the above described designs the incoming air means 12 comprises a terminal member 12a and a body envelope 12b located therein, these being provided with a passage aperture for air current through a perforated plate $12b_1$ or equivalent air penetrating surface, e.g. louver. The air flow is generated by a blower 12c or equivalent. Respectively, the suction means 11 comprises a terminal member 11a and a body envelope 11b thereon, this being provided with a passage aperture for air flow through a perforated plate $11b_1$ or equivalent, covering this passage aperture. The air flow is generated by a blower 11c.

On the air mass E located in a work space 13 is focussed an attraction force, and respectively, impure air is moved with the aid of a pushing force produced to the other side of the impure air mass and/or excessively hot air mass E by bringing a blowing to said side from the incoming air means 12.

In FIG. 1A is presented an embodiment in which the air discharge surface 12' of the incoming air means is located substantially vertically; respectively, the suction surface 11' of the suction means 11, advantageously perforated surface, is also located vertically. A work space 13 has been disposed between the incoming air means 12 and the suction means 11. At this work spot 13 the distance of the terminal members 11a and 12a of said means 11 and 12 is arranged in the range. The air mass E of the work spot 13 above the working surface 13' of a work spot 13 is given a certain speed. The surface area $A_1$ of the entry aperture of the air in the incoming air means 12 and, at the same time, of the air discharge surface 12' is greater than or equal to the surface area $A_2$ of the suction surface 11' of the suction means 11 and of the suction aperture.

In FIG. 1A is presented in solid lines an embodiment of the invention in which the incoming air means 12 has been arranged to draw the air of a room space H. Hereby, the duct section connected to the suction part of a blower 12c has been arranged to draw the impurities from the room space and in such manner to terminate in the room space H. In said embodiment of the invention the incoming air means 12 may comprise a means design in which the blower has been disposed to be located in the body of the terminal member 12a itself, and the suction part of the blower has been disposed to open directly, without a longer duct portion, into the room space H.

In FIG. 1A is presented, in broken lines, an embodiment of the invention in which the duct 12d has been disposed to open out of doors. In this embodiment, fresh air is brought into the work spot.

Figure 1B:
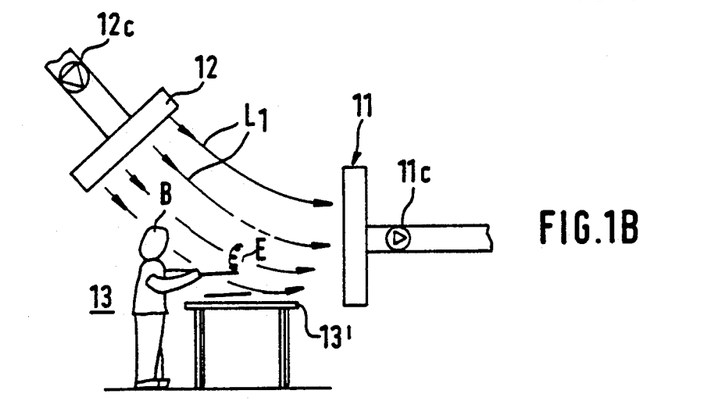
FIG. 1B presents a partially schematic view of second advantageous embodiment.

In FIG. 1B is presented an embodiment of the invention in which the air discharge surface 12' of the incoming air means 12, that is, of the blower, has been disposed into inclined position relative to the horizontal plane. In this embodiment the air is directed obliquely downwards from the incoming air means 12 wherefrom it passes towards the suction means 11. This flow removes the impurities and/or excess heat E from the respiratory zone of the person working at said work space 13. The blow directed from the incoming air means 12 carries fresh air into the respiratory zone. Therefore, in this arrangement of the invention, not only the impure air and/or excess heat E of the work spot is removed by means a of "push-pull effect", but simultaneously such air is carried into the respiratory zone of the person working in the work space 13, which has a refreshing effect on the working person. The air may be taken either directly from the same room space and/or from out of doors and/or from another source of air.

Figure 1C:
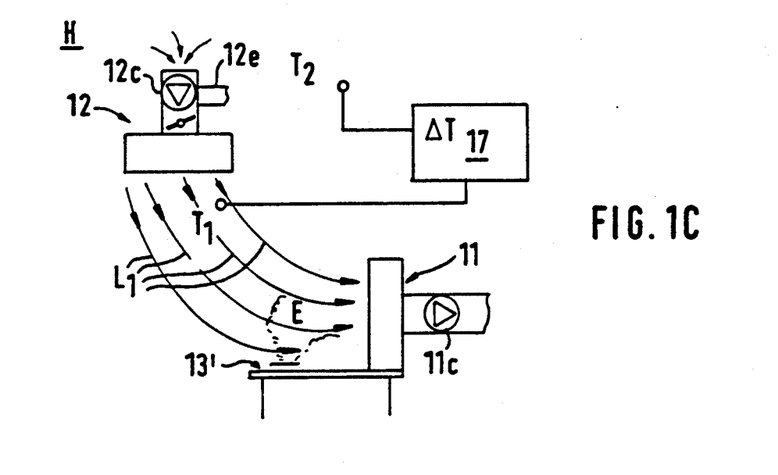
FIG. 1C presents a partially schematic view of third advantageous embodiment of the means and the procedure of the invention.

In FIG. 1C is presented a third advantageous embodiment of the invention. The terminal member 12a of the incoming air means 12 has been disposed to be located above the work spot 13 and the person P working in said work spot 13 so that the air discharge surface 12' of the incoming air means, or the blower means 12, has been disposed to be substantially horizontal. In the embodiment of the invention presented in FIG. 1C the temperature $T_1$ of the air entering through the incoming air means 12, and respectively, the temperature $T_2$ of the rest of the room air outside the air discharging from the incoming air means are measured. As taught by the invention, the differential temperature $\Delta T = T_1 - T_2$ is adjusted with an adjusting means S. If the air entering the work spot from the incoming air means 12 is considerably lower in temperature than the temperature $T_2$ of the rest of the room space air, the buoyancy will not affect the incoming air but the greatest influencing factor in focussing the air into the suction means 11 is the speed and impulse of the air discharging from the incoming air means 12. If, as taught by the invention, the differential temperature $\Delta T$ is so controlled that the temperature of the incoming air (arrow $L_1$) is greater than the temperature $T_2$ of the other room space air, the buoyancy affects the air discharging from the incoming air means 12 and, especially when the impulse is small, the air tends to ascend. In this manner the air flow is focussed obliquely on the suction means 11. Right in the adjacency of the terminal member 12a of the blower means 12, the effect of the air current speed is greatest. When the distance from the terminal member 12a of the incoming air means 12 increases, the influence of the buoyancy starts to grow and the air flow is focussed, as shown in the figure, more and more on the suction means 11, on its terminal member 11a. The suction surface 11' of the terminal member 11a is substantially vertical.

In the apparatus arrangement and the procedure of the invention, by adjusting the temperature of the air discharging from the incoming air means 12 and/or the other room space air, the direction of the air flow (arrow $L_1$) is regulated. The air flow $L_1$ may in this manner be focussed on the suction means 11.

As presented in FIG. 1C, the blower 12c comprises e.g. a thyristor control with the aid of which the throw length of the air to be blown from the incoming means 12 is moreover determined. The rpm of the blower or fan 12c is adjustable. The adjusting means of the blower 12c is indicated by reference numeral 12e. In the embodiment of the invention, as shown in FIG. 1C, in addition to the adjustment of the rpm of the blower, the flow can be regulated with dampers, or using by-pass flow. In addition to the adjusting means 17, all above-described adjustments can be used separately or simultaneously.

The already excessively hot air may also be focussed on the suction means, as shown by FIG. 1C. Too hot air may be drawn from the room space H, or from the room space in which a work spot is located. This air is furthermore heated in the blower.

Figure 1D:
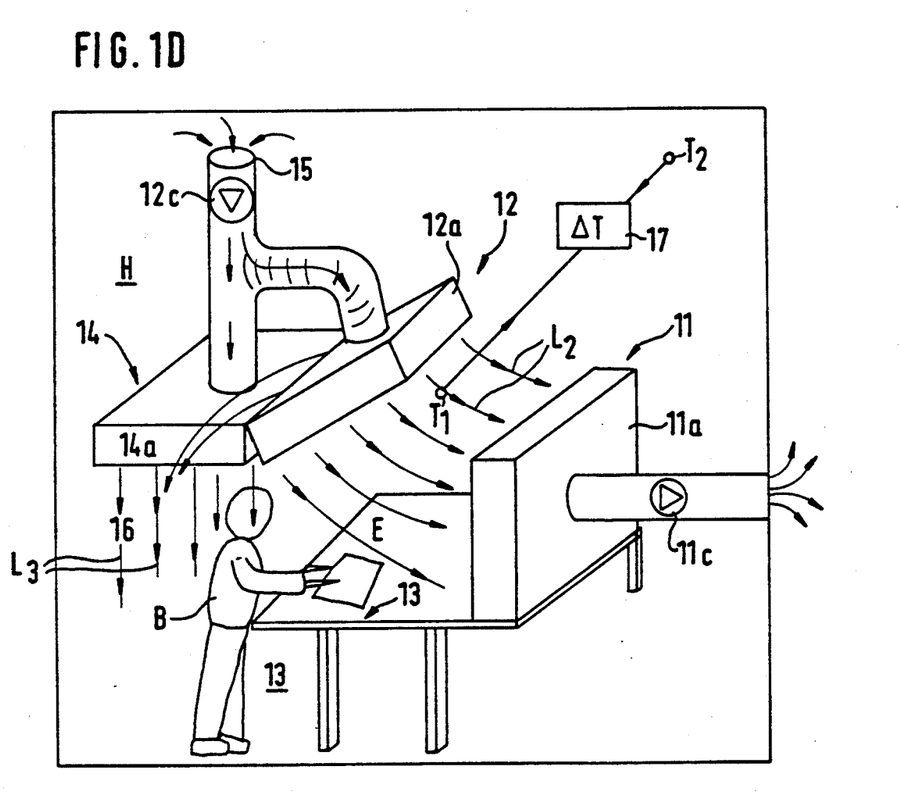
FIG. 1D presents a partially schematic view of fourth advantageous embodiment of the procedure and the means of the invention.

In FIG. 1D is presented a fourth advantageous embodiment of the method and the means of the invention. The work spot 13 comprises a working table 13 on which e.g. electronic soldering work is being carried out. Impure air E passes with the aid of the apparatus 11,12 off from the respiratory zone of the person working in said work spot 13. A suction means 11 draws and an incoming air means 12 pushes the impure air mass E off from the vicinity of the person working in said work spot (passage of the air is presented with arrows $L_2$). Furthermore, the apparatus comprises a second incoming air means 14 through which fresh incoming air is transmitted from out of doors, or as presented in the embodiment of the figure, the air of the same room space (H) to the respiratory zone of the person working in the work space 13 (arrow $L_3$).

The air is transmitted into the terminal members 12a along one duct 15. The terminal member 12a may be adjustable and turnable concerning its discharge surface 12'. Therefore, the direction of the discharge surface 12' of the terminal member 12a can be adjusted by turning the terminal member 12a supported by hinge means 16 or equivalent. Furthermore, concerning the embodiment of FIG. 1D, the direction of the air discharging from the terminal member 12a can be adjusted by changing the temperature difference $\Delta T$ between the temperature $T_1$ of the air discharging from the terminal member 12a and the temperature $T_2$ of the rest of the room space air outside said discharging air flow with an adjusting means 17.

In FIG. 1D is presented a schematically defined room space H. In the embodiment of FIG. 1D, the air of the room space H is drawn through the duct 15. The duct portion 15 may therefore be relatively short. In the instance of FIG. 1D, the throw configuration of the air discharging from the incoming air means may also be regulated with regulating dampers using by-pass flow, or by adjusting the rpm of the blower. The above adjustments may be used simultaneously or separately.

Figure 1E:
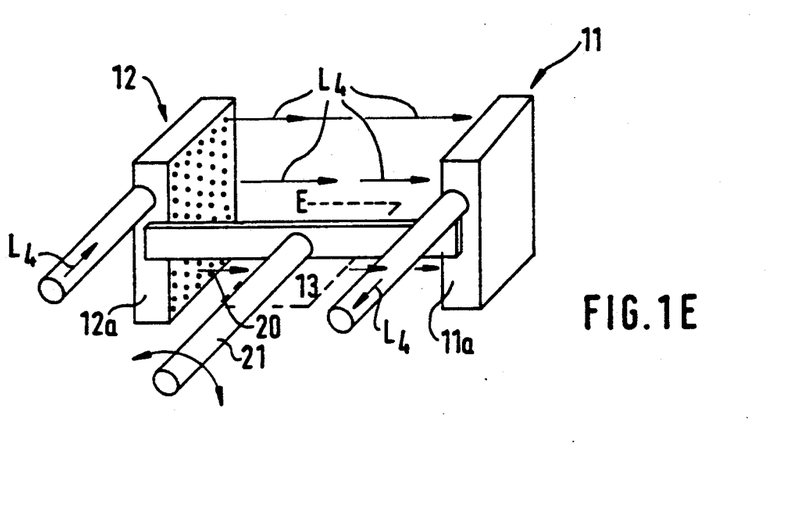
FIG. 1E presents a partially schematic view of fifth advantageous embodiment of the procedure and the means of the invention.

In FIG. 1E is presented a means design e.g. for soldering work or the equivalent used in the electronics industry. The apparatus comprises the terminal member 12a of an incoming air means and the terminal member 11a of a suction means. These terminal members have mechanically been connected at their body envelopes with one another with a bar 20. The bar 20 with the terminal members 11a and 12a connected thereto may, for determining the transmission direction of the impurities E, be inclinable by turning the shaft 21 connected with the bar 20. The air passage is indicated by arrows $L_4$.

Figure 1F:
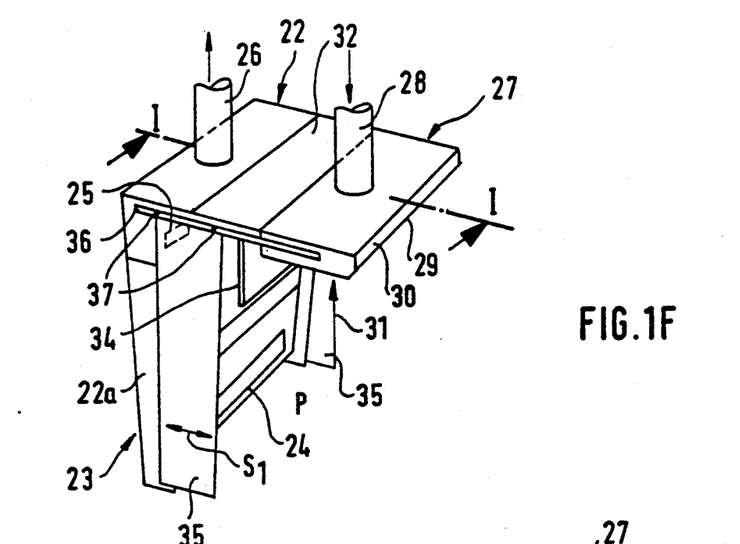
FIG. 1F presents a partially schematic view of the apparatus of the invention in axonometric view.

As shown in FIG. 1F, the focussed ventilation apparatus comprises the body 22 of the focussed suction terminal member formed to be a housing structure comprising an interior space 22a of said housing structure, into which the air drawn in the focussed suction is first drawn. In the housing body 22 focussed suction apertures 24 and 25 have been made for the focussed suction of the focussed suction means 23 through which impure air is drawn off from the work spot into the interior 22a of the body structure 22, and furthermore out through a duct 26, for instance with an outlet blower.

The apparatus of the invention comprises furthermore an incoming air means 27 located above the work spot P, whereby through an incoming air duct 28 air is flown into the terminal member 29 of the incoming air means 27, and furthermore above the work spot (P). The terminal member 29 comprises a body 30 and a horizontal air discharge surface 31, advantageously perforated surface.

The apparatus comprises furthermore a body part 32 presented in FIG. 1F and serving as an intermediate member which connects the body 30 of the terminal member 29 for the incoming air with the body 22 of the terminal member for the focussed suction.

For this reason, the design presented in FIG. 1 is a compact, united structure which is easy to install e.g. above the working table 33 of the work spot P.

Figure 2:
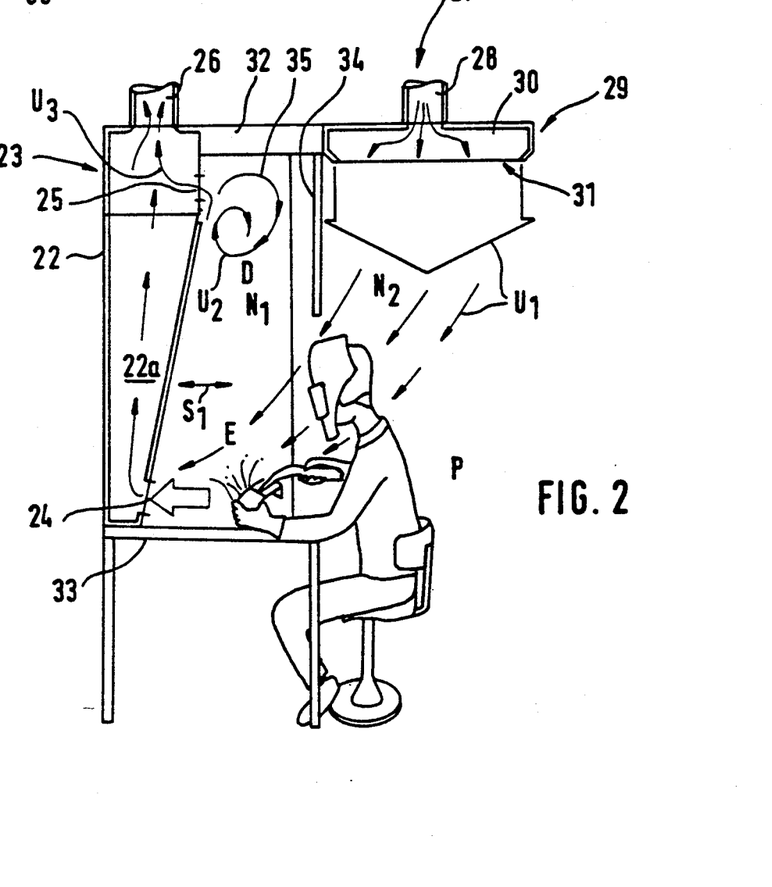
FIG. 2 presents a view along the lines I—I of the apparatus of FIG. 1F, and in the illustration of the figure is also included the person working in the work spot and the structure of the working table.

FIG. 2 presents a section I—I of FIG. 1. In the figure a person working at the work spot and a working table 33 have been added. Incoming air is carried above the work spot P with the incoming air means 27. The air is transmitted either from outside or from the same room through a duct 28 into the terminal member 29 of the incoming air, and this air being discharged through the air discharge surface 31, as shown by arrow $U_1$ in that the air passes towards the source of impurities and/or excess heat, thus preventing impurities from entering the respiratory zone of the worker.

The air is drawn with the aid of the focussed air means 23 into the housing structure 22a of the body 22 from the vicinity of the work spot. The body 22 comprises suction apertures 24 and 25 through which impure air of the work spot is removed into the interior 22a of the housing structure of the body 22 and further along the duct 26 with a blow generated by the blower. As shown in FIG. 2, the apparatus arrangement of the invention comprises a vertical wall 34 located in front of the person working in the work spot, in the vicinity of the edge 33a of the working table 33 above the work spot. The incoming air means 27 is so located that the air discharges downwards, as shown by arrow $U_1$, and is focussed on the job target of the person working in the work spot and furthermore on a first suction aperture 24 in the immediate vicinity of the working table 33. Furthermore, the apparatus of the invention comprises a second suction aperture 25 which is located in the region between the vertical wall 34 and the body 22, in the space above the source of impurity and/or excess heat E of the work space P. The air entered into said space D whirls (arrow $U_2$), and said whirling air is drawn (arrow $U_3$) through the aperture 25 into the interior space 22a of the body 22 and further, out of the means along the duct 26.

Furthermore the apparatus of the invention comprises at least one side wall 35. The side wall 35 may be a fixed side wall or it may be advantageously modifiable and adjustable in location. The side wall 35 may also be an elastic structure which is modifiable in shape. The side wall 35 may be a side wall that can be pulled to all sides of the means. The side wall 35 is advantageously movable, as shown by arrow $S_1$, at least in horizontal direction, but this side wall 35 may also be moved, not only in horizontal direction but also in vertical direction, or merely in vertical direction. Consequently, the height position of the side wall can be regulated. The side walls 35 have been so connected to the apparatus that they can be moved relative to the body structure 22;27,28,29,31;32, and advantageously, this movement of the side walls 35 is carried out on rails 36 (in FIG. 1F), this rails 36 being disposed to move horizontally to the plane of the air discharge surface 31 of the incoming air means 27, or in the adjacency thereof. Each side wall 35 has been disposed to move e.g. on rolls 37. The function of the side walls is to prevent the excess heat and/or impure air or gas produced in the source of impurities from entering the surroundings of the work spot, for instance the room space. The function of the side walls is, therefore, to assist the focussed suction and the flow of the incoming air carried into the work spot. The function of the partitions is also to act as a preventive means against disturbance flows, as an ignition shield, and as light focussing surfaces. If the apparatus is used in welding, the side walls serve as glare shield walls. The side walls 35 have been coupled to the means advantageously so that they are located, for instance on both sides of the working table and they are connected, at least in part, to the sides of the body 22 of the suction means 23. In this manner is produced a protected working space.

Figure 3A:
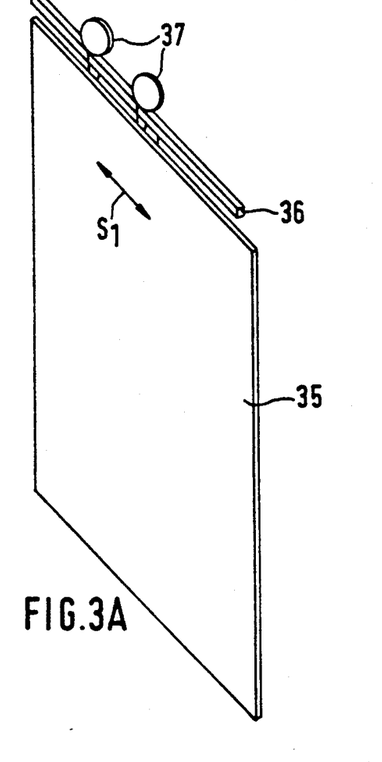
FIG. 3A presents in axonometric principle view a side wall which in position is adjustable horizontally.

In FIG. 3A is presented axonometrically the mobile pivoting of the side wall 35 on the rolls 35 to the rails 36.

Figure 3B:
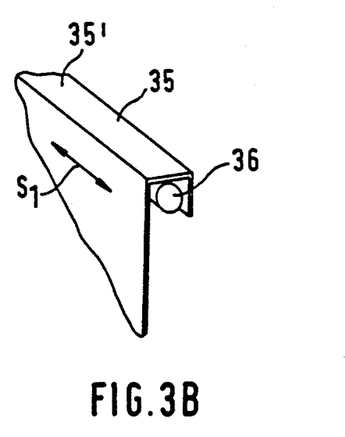
FIG. 3B presents in axonometric the coupling of the side wall with a rail in a second embodiment of the rail design deviating from FIG. 3A.

In FIG. 3B is presented a second embodiment of the horizontal adjustability ($S_1$) of the side wall. In the embodiment of the figure, the side wall 35 has at the upper end been provided with an L profile 35', this profile being positioned on the rail 36.

Figure 4:
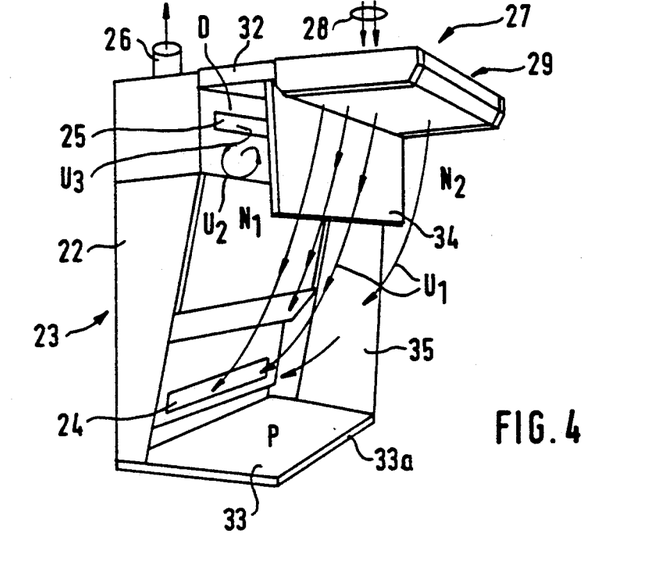
FIG. 4 presents the operation of the means of the invention in principle. The presentation is axonometric.

In FIG. 4 is presented axonometrically the operation of the means of the invention. As shown in the figure, incoming air is carried above the work spot P, and the incoming air passes further, as shown by arrow $U_1$, via the respiratory zone of the worker towards the source of impurities E and further towards the outlet. Through the suction aperture 24 the majority of the impurities are drawn off. With a partition 34 the air space of the means is divided into a work space $N_1$ and a stay room $N_2$ on the other side of the partition. In the upper space D defined by the partition 34 and the housing-like body 22 therebetween is generated a whirling $U_2$ of the pure air and partly of the impure air from the source of impurities, and this whirling air is removed from the upper space D through the upper suction aperture 25.

In the figure is seen the advantageous operation of the partition 34 when the partition guides the incoming air flow $U_1$ towards the work spot and, at the same time, the partition prevents impurities which have entered the upper top space D of the work spot from being mixed with the air of the room space H, whereby through the second outlet aperture or apertures 25 said top-side air is drawn into the interior 22a of the body 22 of the focussed suction 23 and further, along the duct 26 from the vicinity of the means. The side wall 35 prevents efficiently the impure air from entering in lateral direction into the room space, whereby the discharge of the impure air of the work spot and/or excess heat of the work spot is improved from what it was before, and the effect of the focussed suction is assisted, and the harmful effects of the flows of the disturbance are eliminated. Merely for reasons of presentation, only one side wall 35 is presented in FIG. 4. The side walls 35 may also be so formed that they are modifiable, and allow, for instance, the placing of a long object on the working table 33.

Figure 5:
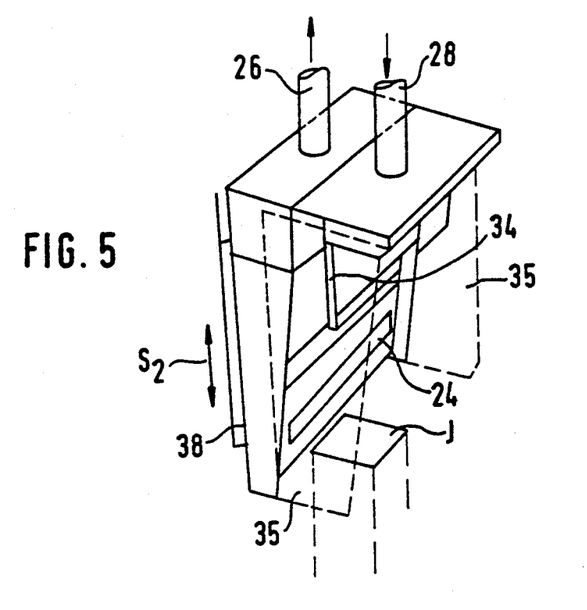
FIG. 5 presents an axonometric view embodiment of the means of the invention in which the means is moved relative to the vertical wall and the means is open from below.

In FIG. 5 is presented the means of the invention and an embodiment thereof in which the means is in vertical location adjustable as shown by arrow $S_2$. The means may be moved, e.g. on rails 38. The means is open from below. In the lower space of the means may be positioned a jig J, as shown in the figure. The working space $N_1$ and the stay space $N_2$ have been mutually separated with a partition 34.

Figure 6:
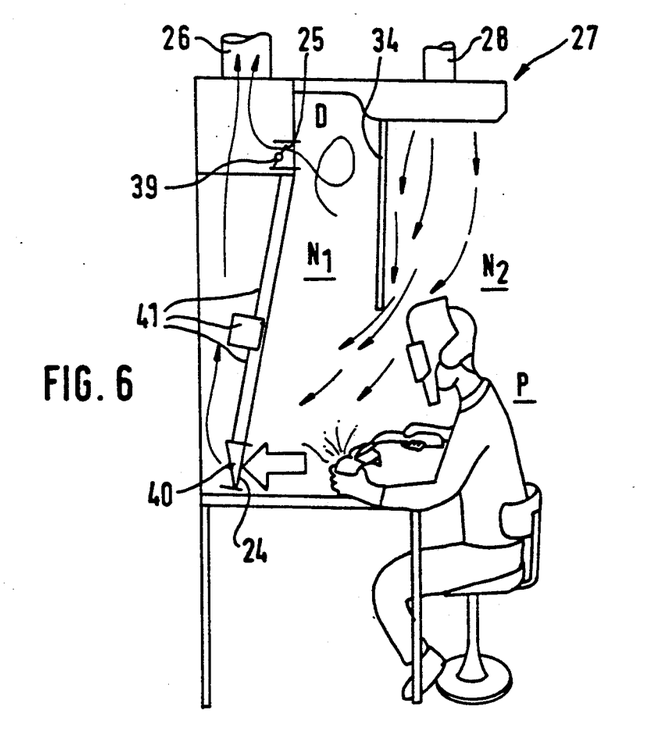
FIG. 6 presents a partially schematic view of the adjustment of the lower focussed suction and the upper focussed suction of the means of the invention.

In FIG. 6 is presented in principle the adjustment of the underside focussed suction 24 and the top side focussed suction 25. The focussed suction aperture 24 comprises an adjustment means 40; respectively, the focussed suction aperture 25 comprises an adjustment means 39. The adjustment means 39 and 40 are controlled, being mutually dependent, with a control apparatus 41 presented in principle in FIG. 6 so that when the lower suction aperture 24 is opened, the upper suction aperture 25 is shut, and vice versa. The most common embodiment of the invention acts, however, so that the opening positions of the adjustment means 40 of the suction aperture 24 and of the adjustment means 39 of the suction aperture 25 can be adjusted without being dependent on one another. Air is flown through the incoming air means 27 so that air is drawn with the blower from the room space H, the pipe 28 consisting of the blower, with the end of the pipe 28 opening into the room space H.

Figure 7A:
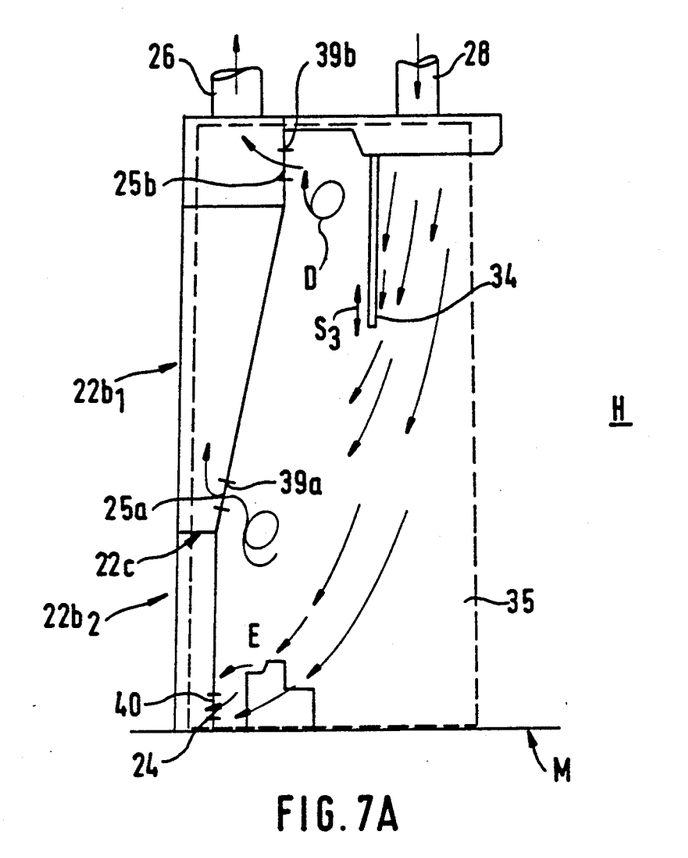
FIG. 7A presents an elevated view of an embodiment of the means of the invention in which a first focussed suction from below is located approximately on the floor level.

In FIG. 7A is presented an embodiment of the invention in which the job target and the source of impurities E are located in the adjacency of the floor level M of the room space H. The body 22 of the suction means 23 has been so formed in the embodiment of the figure that the body comprises an upper body part $22b_2$. The upper body part $22b_1$ comprises a wall 22c to be detachable below, whereby by detaching the wall 22c the air is flown from the interior space 22a of the body part $23b_2$ into the interior space 22a of the bodypart $22b_1$, and further out through the outlet duct 26. The body part 22b comprises a suction aperture 24 close to the adjacency of the floor M. The upper body section $22b_1$ comprises a first upper adjustment means 39a. A a second suction aperture 25b comprises an air flow adjustment means 39b, for instance a check plate. Respectively, the lower body section $22b_2$ and its suction aperture 24 comprise an air flow adjustment means 40. Thus, the outlet air flow can be controlled.

The partition 34 presented in the figure separating the working space $N_1$ and the stay space $N_2$ can be regulated vertically as shown by arrow $S_3$.

Figure 7B:
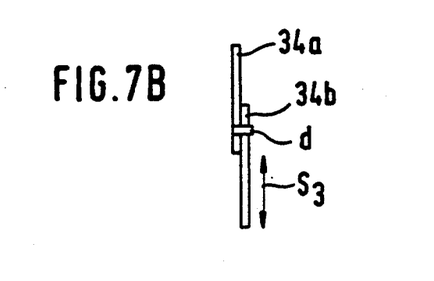
FIG. 7B presents an elevational view showing the adjustability of the partition in vertical level.

In FIG. 7B is presented a means of making the wall 34. The wall 34 comprises a first wall section 34a being attached to the body of the means, and a second wall section 34b, whereby the wall section 34b can be moved (arrow $S_3$) relative to the wall section 34a when the wall sections are connected to one another articulately, e.g. with a connecting bar d which serves as a guide.

We claim:

1. A method for ventilating a work space of a certain volume which is situated within a room having a larger volume, said method comprising the steps of:
   suctioning air from said work space by orienting a suction means such that suction from said suction means is focussed on said work space;
   blowing air into said work space by orienting an air blowing means such that air blown therefrom passes into said work space;
   measuring the temperature differential between said air blown from said air blowing means and air from within said room outside of said work space; and
   varying said temperature differential to consequently vary the throw pattern of air blown from said air blowing means such that said air blown into said work space passes through said work space into said suction means.

2. An apparatus for ventilating a work space of a certain volume which is situated within a room having a larger volume, said apparatus comprising:
   means for suctioning air from said work space comprising a suction duct and a terminal member having perforations therein and surrounding said suction duct;
   means for blowing air into said work space;
   means for measuring and adjusting the temperature differential between said air blown into said work space by said means for blowing air and air from within said room outside of said work space such that said air blown into said work space by said air blowing means is caused to flow through said work space into said terminal member of said suctioning means.

* * * * *